US008514703B2

(12) United States Patent
Lee et al.

(10) Patent No.: US 8,514,703 B2
(45) Date of Patent: Aug. 20, 2013

(54) SCHEDULING OF LOGICAL CHANNELS IN A WIRELESS COMMUNICATION SYSTEM

(75) Inventors: Kuo-Chun Lee, San Diego, CA (US); Walid Mostafa Harndy, San Diego, CA (US); Reza Shahidi, San Diego, CA (US); Srinivasan Balasubramanian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 303 days.

(21) Appl. No.: 12/944,413

(22) Filed: Nov. 11, 2010

(65) Prior Publication Data
US 2012/0120880 A1    May 17, 2012

(51) Int. Cl.
H04J 1/16    (2006.01)
(52) U.S. Cl.
USPC .......................... 370/230.1; 370/230; 370/235
(58) Field of Classification Search
USPC ..................... 370/413, 329, 230, 230.1, 235
See application file for complete search history.

(56) References Cited

U.S. PATENT DOCUMENTS

| 6,167,030 | A  | * | 12/2000 | Kilkki et al. ................. 370/236 |
| 7,050,415 | B2 | * | 5/2006  | Herrmann et al. ............ 370/338 |
| 8,165,152 | B2 | * | 4/2012  | Sammour et al. ............ 370/437 |
| 8,218,438 | B1 | * | 7/2012  | Howe et al. ................. 370/230.1 |
| 2002/0036984 | A1 | * | 3/2002 | Chiussi et al. ............... 370/232 |
| 2007/0070895 | A1 | * | 3/2007 | Narvaez ...................... 370/230 |
| 2007/0248014 | A1 |   | 10/2007 | Xie et al. |
| 2008/0159135 | A1 |   | 7/2008  | Caram |
| 2009/0196175 | A1 | * | 8/2009 | Sammour et al. .......... 370/230.1 |
| 2010/0098011 | A1 | * | 4/2010 | Pelletier et al. .............. 370/329 |
| 2010/0118796 | A1 | * | 5/2010 | Yi et al. ....................... 370/329 |
| 2010/0118892 | A1 |   | 5/2010  | Nguyen et al. |
| 2010/0232387 | A1 | * | 9/2010 | Marchand et al. ........... 370/329 |
| 2011/0317556 | A1 | * | 12/2011 | Hiehata et al. ............ 370/230.1 |

FOREIGN PATENT DOCUMENTS

| EP | 1307009 A1 | 5/2003 |
| EP | 2071896 A2 | 6/2009 |
| WO | 2006068595 A1 | 6/2006 |
| WO | 2008082599 A1 | 7/2008 |

OTHER PUBLICATIONS

International Search Report and Written Opinion—PCT/US2011/060277—ISA/EPO—Mar. 5, 2012.

* cited by examiner

Primary Examiner — Ricky Ngo
Assistant Examiner — Dewanda Samuel
(74) Attorney, Agent, or Firm — Kam T. Tam

(57) ABSTRACT

Techniques for scheduling logical channels for data transmission are described. In one design, a user equipment (UE) is configured with a plurality of logical channels for sending data on the uplink. Each logical channel is associated with a priority and a data buffer size. The UE maintains a token bucket for each logical channel. In each scheduling interval or when an uplink grant is received, the UE determines a bucket level (which may be a positive value or a non-positive value) for each of the plurality of logical channels. The UE ascertains logical channels with bucket levels of the same polarity and then identifies logical channels of the same priority among all logical channels with the same bucket level polarity. The UE selects at least one identified logical channel for scheduling based on the data buffer size and/or the bucket level for each identified logical channel.

36 Claims, 7 Drawing Sheets

SCHEDULING OF LOGICAL CHANNELS IN A WIRELESS COMMUNICATION SYSTEM

BACKGROUND

I. Field

The present disclosure relates generally to communication, and more specifically to techniques for scheduling data transmission in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be configured with a number of logical channels that may be used to send different types of data (e.g., traffic data, control/signaling data, etc.) to a base station. The UE may be assigned some resources to transmit data to the base station. The assigned resources may be less than the resources required to transmit all logical channels having data to send. It may be desirable to efficiently schedule logical channels for data transmission in such a scenario.

SUMMARY

Techniques for scheduling logical channels for data transmission on the uplink or downlink are described herein. For the uplink, a UE may be configured with a plurality of logical channels, which may be available to send data on the uplink. Each logical channel may be associated with (i) a particular priority that may be set to one of a plurality of possible priority levels, (ii) a particular data buffer size indicative of the amount of data to send on the logical channel, and (iii) a particular prioritized bit rate indicative of an average data rate for the logical channel. The UE may maintain a token bucket for each of the plurality of logical channels. For example, the UE may update (e.g., increase) a bucket level for each logical channel in each time interval based on the prioritized bit rate for the logical channel. The UE may also update (e.g., decrease) the bucket level for each logical channel that is scheduled for data transmission.

The UE may schedule logical channels for data transmission, e.g., in each scheduling interval or when an uplink grant is received by the UE. In one design, the UE may determine the bucket level for each of the plurality of logical channels. The bucket level for each logical channel may be a positive value or a non-positive value and may be indicative of tokens available for use to send data on the logical channel. The UE may ascertain logical channels with bucket levels of the same polarity, e.g., either positive or non-positive. The UE may then identify logical channels of the same priority among all logical channels with bucket levels of the same polarity. The identified logical channels may have the same priority and the same bucket level polarity. The UE may select at least one of the identified logical channels for scheduling based on the data buffer size and/or the bucket level for each of the identified logical channels. The UE may schedule the at least one selected logical channel for data transmission.

In one design of channel selection, the UE may select one identified logical channel at a time for scheduling. In one design, the UE may determine a metric for each identified logical channel based on the data buffer size and/or the bucket level for the identified logical channel. The UE may sort the identified logical channels in an order based on the metric for each identified logical channel, e.g., from largest/best metric to smallest/worst metric. The UE may then select one identified logical channel at a time for scheduling based on the order of the identified logical channels. The metric for each identified logical channel may be equal to the data buffer size, or a normalized data buffer size, or the bucket level, or a normalized bucket level, or a weighted sum of the data buffer size and the bucket level, or a normalized weighted sum, or some other quantity for the identified logical channel. In another design of channel selection, the UE may select one identified logical channel at a time for scheduling based on round robin.

In yet another design of channel selection and scheduling, the UE may select multiple (e.g., all) identified logical channels for scheduling at the same time. The UE may determine a fractional allocation for each identified logical channel based on the data buffer size and/or the bucket level and possibly a normalization factor for the identified logical channel. The UE may then allocate the available resources to each identified logical channel based on the fractional allocation for that identified logical channel.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
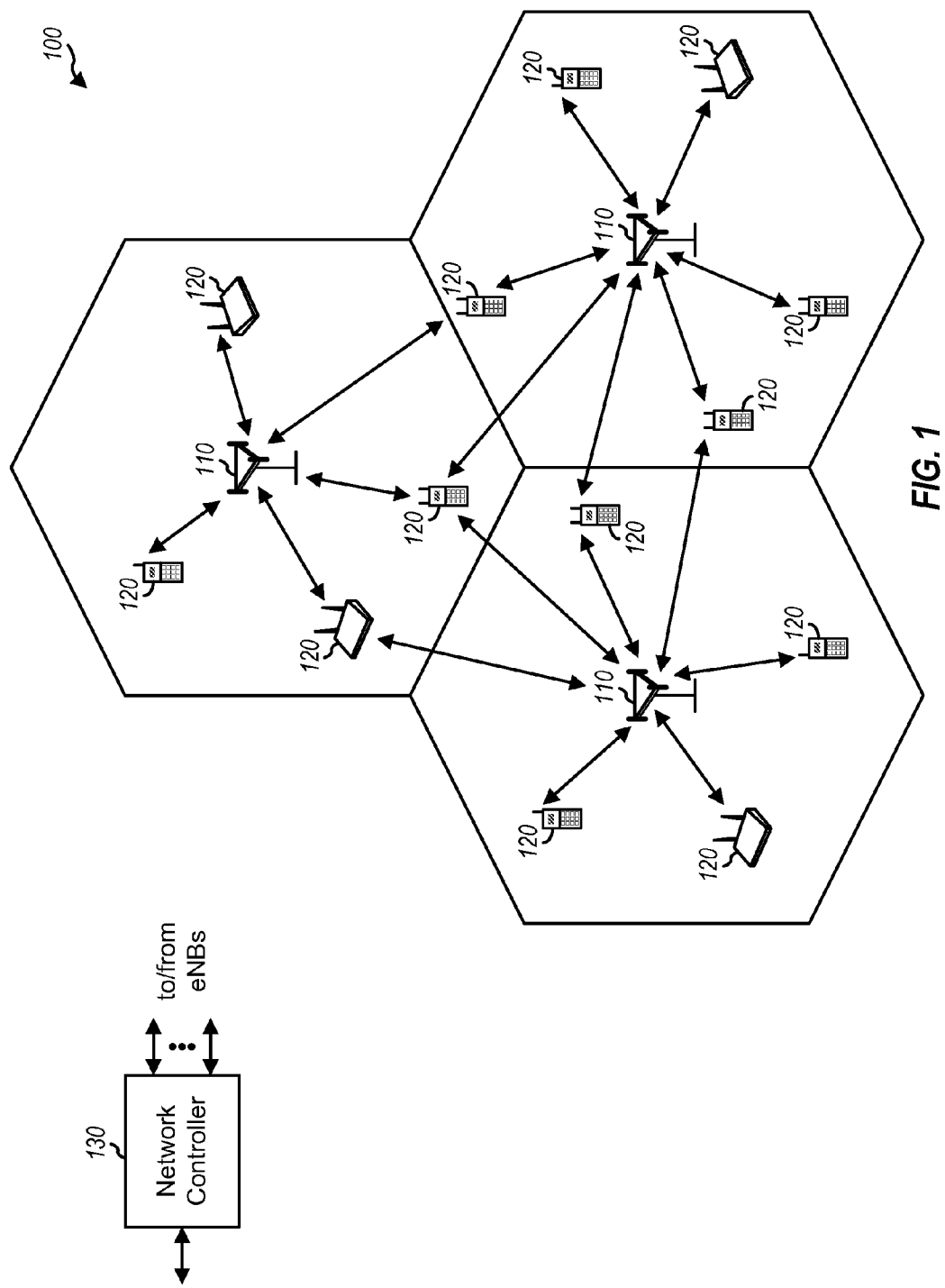
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for these eNBs. Network controller 130 may comprise a Mobility Management Entity (MME) and/or some other network entity.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

The techniques described herein may be used to schedule data transmission on the uplink as well as the downlink. For clarity, much of the description below is for scheduling data transmission on the uplink.

A UE may be configured with a number of logical channels to send different types of data to an eNB. The logical channels may also be referred to as (and/or may be associated with) flows, radio bearers, links, etc. For example, the UE may be configured with two logical channels for a voice-over-Internet Protocol (VoIP) call—one logical channel to carry traffic data and another logical channel to carry signaling data for the VoIP call. The UE may also be configured with other logical channels to carry traffic data for Web browsing, broadcast news, etc. Each logical channel may be associated with certain characteristics, which may be dependent on quality-of-service (QoS) requirements (if any) of the data being sent on that logical channel.

Figure 2:
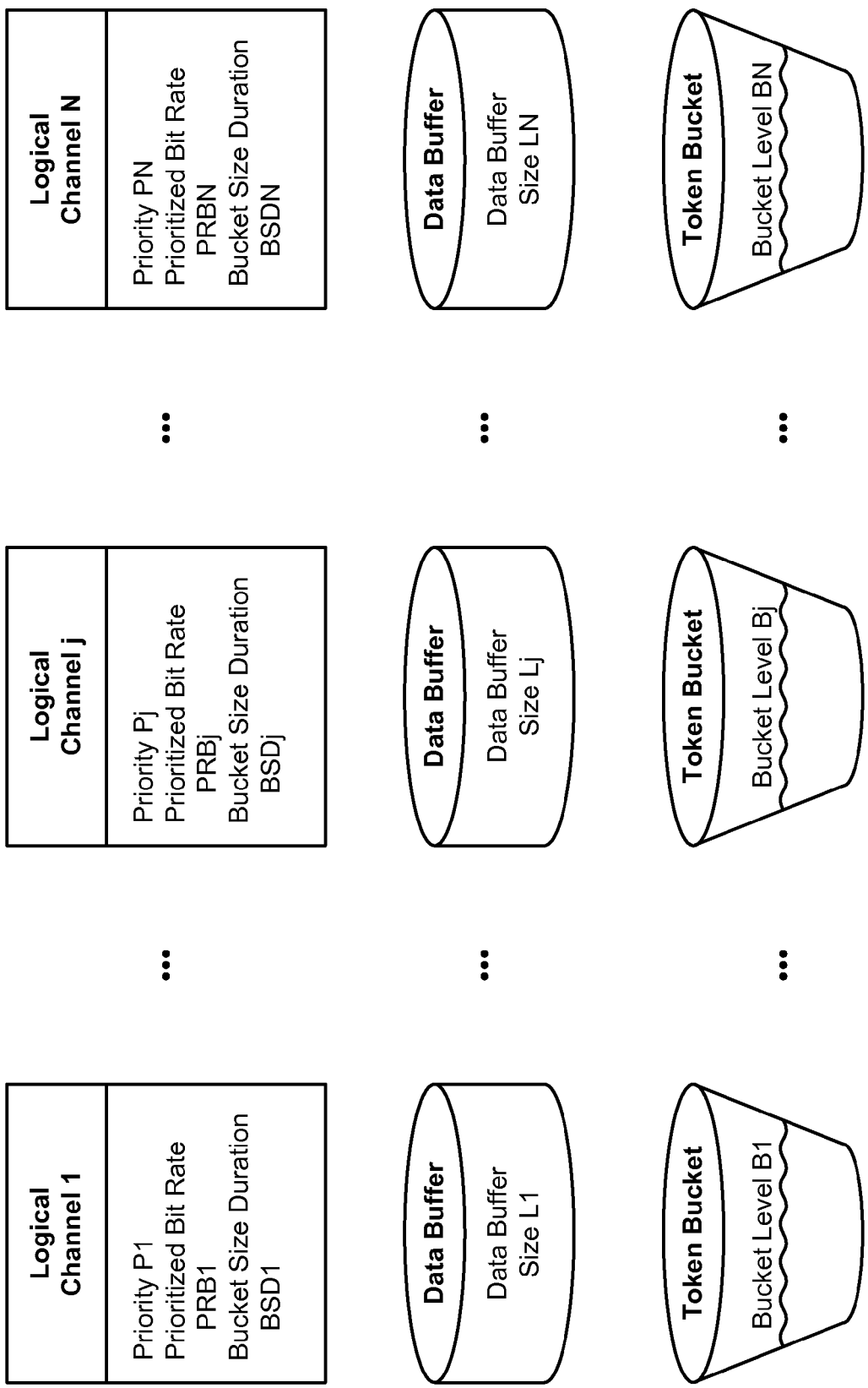
FIG. 2 shows a set of logical channels configured for a UE.

FIG. 2 shows a set of N logical channels 1 through N configured for a UE. Each logical channel j, for $j \in \{1, \ldots, N\}$, may be associated with the following parameters:

Priority $P_j$—indicative of relative importance of logical channel j for scheduling, Prioritized bit rate $PBR_j$—indicative of an average data rate for logical channel j, and Bucket size duration $BSD_j$—indicative of a peak data rate for logical channel j.

The logical channels and their parameters $P_j$, $PBR_j$ and $BSD_j$ may be configured for the UE by upper layers (e.g., Radio Resource Control (RRC) layer in LTE). Each logical channel may be assigned a priority within a range of 1 to 16 (or $1 \leq P_j \leq 16$), with a smaller $P_j$ value corresponding to higher priority, and vice versa.

Each logical channel may be associated with a data buffer for storing data to send on that logical channel. The amount of data in the data buffer for logical channel j may be referred to as a data buffer size $L_j$. $L_j$ may be given in units of bytes or some other quantity.

Each logical channel may also be associated with a token bucket (or simply, a bucket), which may be used to make scheduling decisions for the logical channel. The bucket for each logical channel may be associated with a particular bucket size $BS_j$ and a particular bucket level $B_j$, which may be determined as described below.

Figure 3:
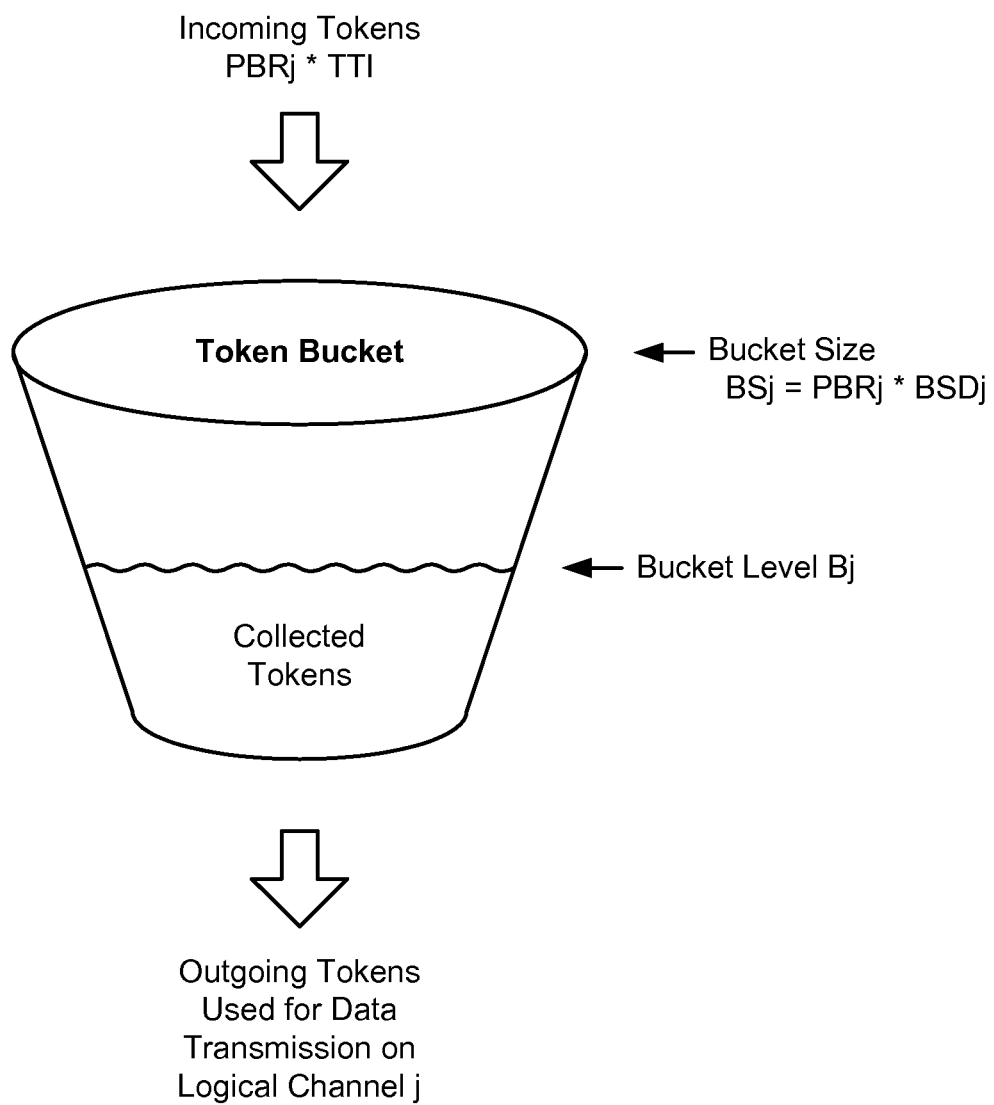
FIG. 3 shows a token bucket for one logical channel.

FIG. 3 shows a token bucket for one logical channel j. The bucket is initialized to zero (or empty) when logical channel j is established. Thereafter, the bucket is filled with $PBR_j$*TTI tokens/credits in each transmission time interval (TTI). Each token may correspond to one byte or some other unit of data. A TTI may be 1 millisecond (ms) in LTE or some other duration. $PBR_j$ is thus indicative of an average data rate for logical channel j. The bucket level $B_j$ refers to the amount of tokens collected by the bucket and available for use. The bucket has a bucket size of $BS_j$, which may be expressed as:

$$BS_j = PBR_j * BSD_j, \qquad \text{Eq (1)}$$

where $PBR_j$ and $BSD_j$ are parameters configured for logical channel j.

The bucket level $B_j$ is limited by the bucket size $BS_j$ and is given as $B_j \leq BS_j$. Hence, incoming tokens are discarded when the bucket level is equal to the bucket size. $PBR_j$ for logical channel j may be set to infinity. In this case, $B_j$ is equal to $BS_j$ for logical channel j.

The tokens in the bucket for logical channel j may be used to schedule logical channel j for data transmission. When logical channel j is scheduled with one or more Medium Access Control (MAC) service data units (SDUs), the bucket level $B_j$ is reduced by the total size of all MAC SDUs sent on logical channel j. The MAC SDUs may also be referred to as packets, transport blocks, data blocks, etc. In LTE, the bucket level $B_j$ can be a positive value, or zero, or a negative value. A positive $B_j$ value means that tokens are available in the bucket. A negative $B_j$ value means that data has been sent on logical channel j when there are no tokens in the bucket.

Figure 4:
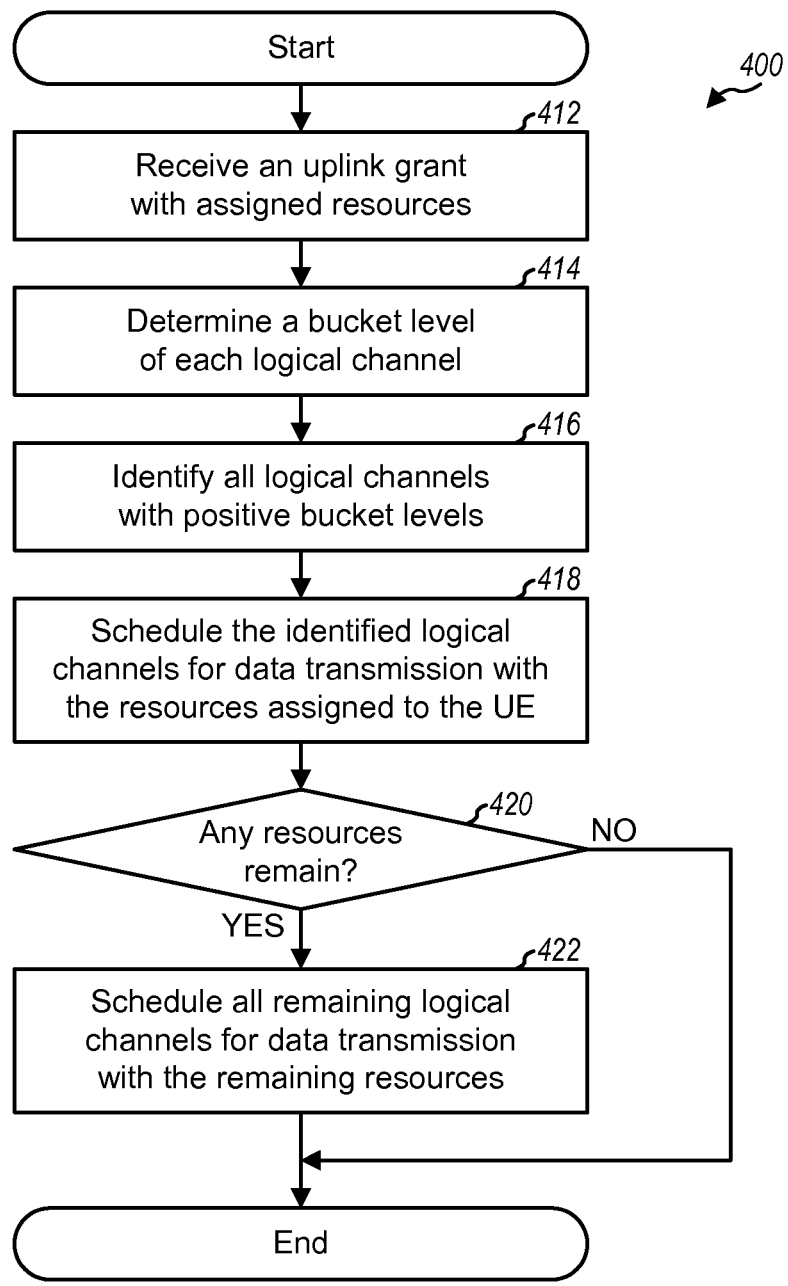
FIG. 4 shows an overall process for scheduling logical channels.

FIG. 4 shows a flow diagram of a design of a process 400 for scheduling logical channels for data transmission. Process 400 may be performed by a UE in each scheduling interval, or whenever the UE receives an uplink grant from an eNB, or based on some other triggering event.

The UE may receive an uplink grant on a Physical Downlink Control Channel (PDCCH) from the eNB (block 412). The uplink grant may be addressed to the UE based on a Cell Radio Network Temporary Identifier (C-RNTI) assigned to the UE and may include resources assigned to the UE. The assigned resources may comprise time resources, frequency resources, code resources, transmit power, some other resources, or a combination thereof. For example, the assigned resources may comprise a number of resource blocks, with each resource block covering 12 subcarriers in one slot of 0.5 ms in LTE. In one design, the uplink grant does not indicate which logical channels at the UE can be used to send data with the assigned resources. The UE may then schedule one or more logical channels for data transmission based on the assigned resources.

The UE may determine the bucket level for each logical channel at the UE (block 414). The bucket level for each logical channel may be a positive value or a non-positive value, as described above. The UE may identify all logical channels with positive bucket levels, or Bj>0 (block 416). The UE may then schedule the identified logical channels for data transmission with the resources assigned to the UE (block 418). The scheduling in block 418 may be performed as described below. All or a subset of the identified logical channels may be scheduled, and all or a subset of the assigned resources may be allocated to the scheduled logical channels, depending on various factors such as the amount of data to send on each logical channel, the amount of resources assigned to the UE, etc.

After block 418, the UE may determine whether any resources assigned to the UE remain (block 420). If the answer is 'Yes', then the UE may schedule all logical channels, regardless of their bucket levels, with the remaining resources (block 422). Since logical channels with positive bucket levels are scheduled in block 418, the UE may essentially schedule logical channels with non-positive bucket levels in block 422. The process terminates after block 422 and also if the answer is 'No' for block 420.

In the design shown in FIG. 4, scheduling may be performed in two steps. In the first step, logical channels with positive bucket levels are scheduled with the resources assigned to the UE. In the second step, remaining logical channels are scheduled with the remaining resources. For each step, the logical channels may be scheduled based on their priorities, the amount of data to send on each logical channel, the available resources, and/or other factors. After each step, the bucket level for each scheduled logical channel may be updated by the amount of data to send on the logical channel.

The logical channels may also be scheduled in other manners. For example, scheduling may be performed in a single step for all logical channels configured at the UE. Scheduling may also be performed for only active logical channels with data to send, and inactive logical channels with no data to send may be omitted.

Figure 5:
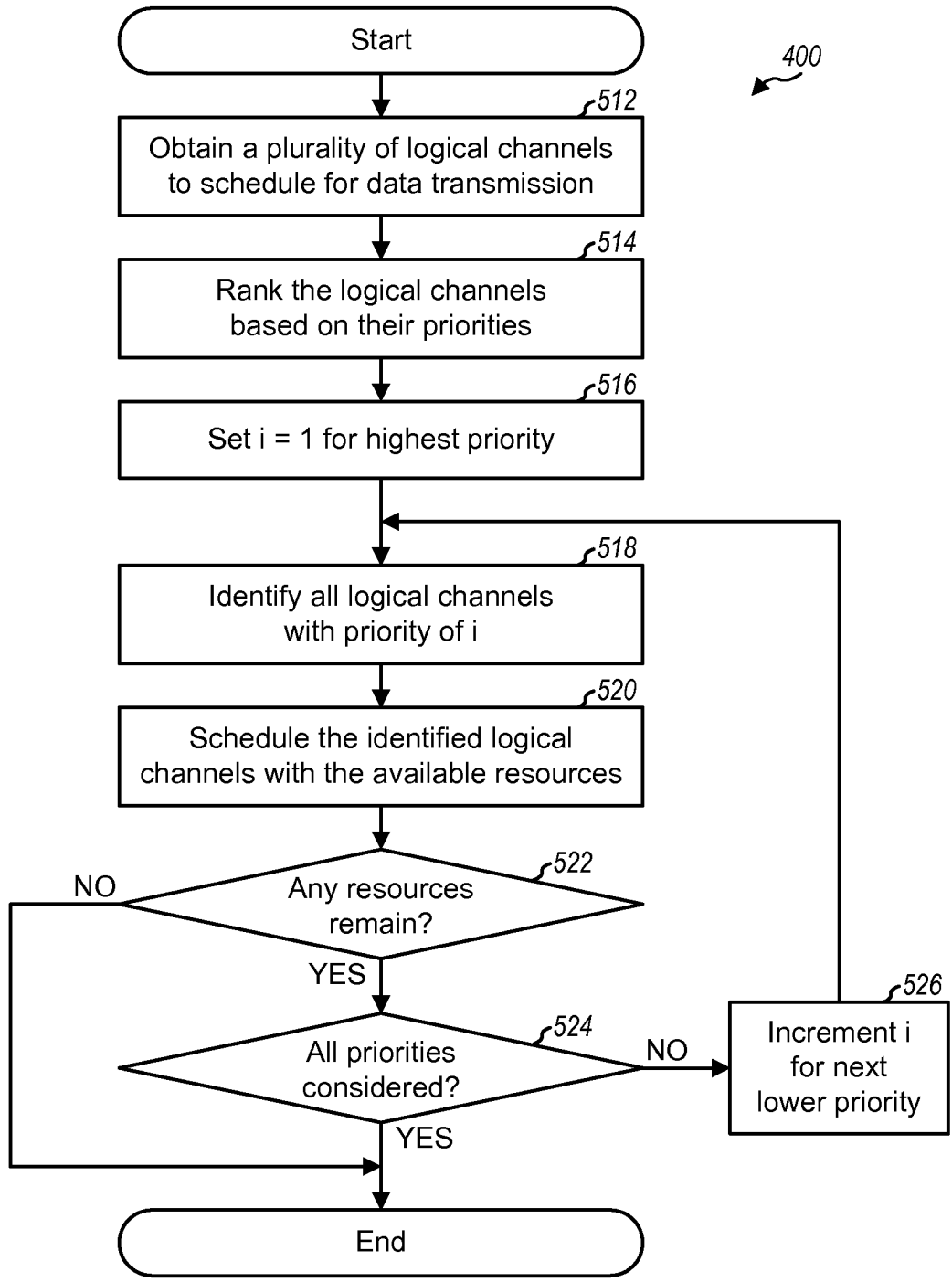
FIG. 5 shows a process for scheduling logical channels with the same bucket level polarity.

FIG. 5 shows a flow diagram of a design of a process 500 for scheduling a plurality of logical channels with the same bucket level polarity. Process 500 may be used for block 418 and also for block 422 in FIG. 4.

The UE may obtain a plurality of logical channels to schedule for data transmission (block 512). These logical channels may have bucket levels of the same polarity, e.g., either positive or non-positive. The UE may rank these logical channels based on their priorities, e.g., from highest priority to lowest priority (block 514). The UE may then schedule the logical channels based on priority, starting with the highest priority and concluding with the lowest priority. The UE may initially set a variable i to 1 for the highest priority (block 516). The UE may then identify all logical channels with priority of i (block 518). The UE may schedule the identified logical channels with the available resources, as described below (block 520). All or a subset of the identified logical channels may be scheduled, depending on the amount of available resources, the amount of data to send, etc.

After block 520, a determination may be made whether any resources remain for scheduling other logical channels (block 522). If some resources remain and the answer is 'Yes' for block 522, then a determination may be made whether all priorities have been considered (block 524). If all priorities have not been considered and the answer is 'No' for block 524, then variable i may be incremented by one to select the next lower priority (block 526). The process may then return to block 518 to schedule all logical channels with priority of i. The process terminates if the answer is 'No' for block 522 and also if the answer is 'Yes' for block 524.

In the design shown in FIG. 5, the logical channels may be allocated resources in a decreasing order of priority. The UE may allocate resources to all logical channels of a given priority i before allocating resources to logical channels of lower priorities. Multiple logical channels may have the same priority. In this case, all logical channels with the same priority may be served equally.

In an aspect, multiple logical channels with the same bucket level polarity and the same priority may be scheduled in a manner to ensure fairness and good performance for all logical channels. These logical channels may have different characteristics (e.g., different QoS and/or bandwidth requirements) and may be scheduled by taking into account their characteristics in order to ensure fairness and good performance. This scheduling may be achieved in various manners and may include two parts—channel selection and channel scheduling. Channel selection may include selecting logical channels for scheduling. Channel scheduling may include allocating resources to each selected logical channel for data transmission. Each part may be implemented with various designs. The two parts may also be implemented concurrently.

In a first design of channel selection, multiple logical channels with the same bucket level polarity and the same priority may be selected in a round robin manner. The UE may arrange the multiple logical channels in a predetermined order, e.g., in a pseudo-random manner or based on one or more criteria such as bucket level, data buffer size, etc. The UE may maintain this predetermined order for all scheduling intervals and may update this predetermined order when the priority of any logical channel changes, or when existing logical channels are removed, or when new logical channels are established, etc.

For the current scheduling interval (e.g., the current TTI), the UE may select one logical channel at a time for scheduling based on the predetermined order. For example, the UE may select the first logical channel for scheduling, then the second logical channel, and so on, then the last logical channel, then back to the first logical channel, and so on. The UE may schedule each selected logical channel for data transmission in various manners, as described below.

The UE may be unable to schedule a selected logical channel in the current scheduling interval. This may be due to, for example, insufficient resources to allocate to the selected logical channel for the amount of data to send on the logical channel. In this case, the UE may skip the selected logical channel in the current scheduling interval and may again select this logical channel in the next scheduling interval. The UE may then continue and select the next logical channel in the predetermined order for scheduling in the current scheduling interval.

In a second design of channel selection, multiple logical channels with the same bucket level polarity and the same priority may be selected based on their data buffer sizes. The UE may arrange the multiple logical channels in an order based on their data buffer sizes, with the first logical channel having the largest data buffer size, the second logical channel having the next largest data buffer size, and so on, and the last logical channel having the smallest data buffer size. The UE may order the multiple logical channels at the start of each scheduling interval, since the data buffer sizes may change from one scheduling interval to the next.

For the current scheduling interval, the UE may select one logical channel at a time for scheduling based on the arranged order. In particular, the UE may select the first logical channel with the largest data buffer size for scheduling, then the second logical channel with the next largest data buffer size, and so on, and then the last logical channel with the smallest data buffer size. The UE may schedule each selected logical channel for data transmission in various manners, as described below.

In a third design of channel selection, multiple logical channels with the same bucket level polarity and the same priority may be selected based on their normalized data buffer sizes. The UE may arrange the multiple logical channels in an order based on their normalized data buffer sizes. The normalized data buffer size for each logical channel may be computed based on one of the following:

$$NLj = \frac{Lj}{PBRj}, \text{ or} \qquad \text{Eq (2)}$$

$$NLj = \frac{Lj}{BSj}, \qquad \text{Eq (3)}$$

where NLj is the normalized data buffer size for logical channel j.

In equation (2), the normalized data buffer size is equal to the data buffer size divided by the prioritized bit rate. In equation (3), the normalized data buffer size is equal to the data buffer size divided by the bucket size. The normalized data buffer size may also be obtained based on some other normalization factor. The normalization may ensure fairness, so that logical channels with lower average data rates and/or smaller bucket sizes do not have to wait longer (on average) than logical channels with higher average data rates and/or larger bucket sizes. The UE may order the multiple logical channels at the start of each scheduling interval, since the data buffer sizes may change from one scheduling interval to the next.

For the current scheduling interval, the UE may select one logical channel at a time for scheduling based on the arranged order. In particular, the UE may select the first logical channel with the largest normalized data buffer size for scheduling, then the second logical channel with the next largest normalized data buffer size, and so on, and then the last logical channel with the smallest normalized data buffer size. The UE may schedule each selected logical channel for data transmission in various manners, as described below.

In a fourth design of channel selection, multiple logical channels with the same bucket level polarity and the same priority may be selected based on the bucket levels. The UE may arrange the multiple logical channels in an order based on their bucket levels, with the first logical channel having the highest bucket level, the second logical channel having the next highest bucket level, and so on, and the last logical channel having the lowest bucket level. The bucket level for a logical channel may be a positive value or a non-positive value, as described above. For positive bucket levels, logical channels with higher bucket levels are ordered before logical channels with lower bucket levels. For non-positive bucket levels, logical channels with less negative bucket levels are ordered before logical channels with more negative bucket levels. For example, if two logical channels have bucket levels of −100 and −200, then the logical channel with a bucket level of −100 is ordered before the logical channel with a bucket level of −200. The UE may order the multiple logical channels at the start of each scheduling interval, since the bucket levels may change from one scheduling interval to the next.

For the current scheduling interval, the UE may select one logical channel at a time for scheduling based on the arranged order. In particular, the UE may select the first logical channel with the highest bucket level for scheduling, then the second logical channel with the next highest bucket level, and so on, and then the last logical channel with the lowest bucket level. The UE may schedule each selected logical channel for data transmission in various manners, as described below.

In a fifth design of channel selection, multiple logical channels with the same bucket level polarity and the same priority may be selected based on their normalized bucket levels. The UE may arrange the multiple logical channels in an order based on their normalized bucket levels. The normalized bucket level for each logical channel may be computed based on one of the following:

$$NBj = \frac{Bj}{PBRj}, \text{ or} \qquad \text{Eq (4)}$$

$$NBj = \frac{Lk}{BSj}, \qquad \text{Eq (5)}$$

where NBj is the normalized bucket level for logical channel j.

In equation (4), the normalized bucket level is equal to the bucket level divided by the prioritized bit rate. In equation (5), the normalized bucket level is equal to the bucket level divided by the bucket size. The normalized bucket level may also be obtained based on some other normalization factor. The normalization may ensure fairness. The UE may order the multiple logical channels at the start of each scheduling interval, since the bucket levels may change from one scheduling interval to the next.

Since the bucket level for a logical channel may be a positive value or a non-positive value, the normalized bucket level for the logical channel may also be a positive value or a non-positive value. For positive normalized bucket levels, logical channels with higher normalized bucket levels are ordered before logical channels with lower normalized bucket levels. For non-positive normalized bucket levels, logical channels with less negative normalized bucket levels are ordered before logical channels with more negative normalized bucket levels. For example, if two logical channels have normalized bucket levels of −0.1 and −0.2, then the logical channel with a normalized bucket level of −0.1 is ordered before the logical channel with a normalized bucket level of −0.2.

For the current scheduling interval, the UE may select one logical channel at a time for scheduling based on the arranged order. In particular, the UE may select the first logical channel with the highest normalized bucket level for scheduling, then the second logical channel with the next highest normalized bucket level, and so on, and then the last logical channel with the lowest normalized bucket level. The UE may schedule each selected logical channel for data transmission in various manners, as described below.

In a sixth design of channel selection, multiple logical channels with the same bucket level polarity and the same priority may be selected based on their data buffer sizes and bucket levels. The UE may compute a weighted sum metric for each logical channel based on the data buffer size and the bucket level for the logical channel, as follows:

$$Mj = \alpha * Lj + (1-\alpha) * Bj, \qquad \text{Eq (6)}$$

where Mj is the weighted sum metric for logical channel j, and $\alpha$ is a weighting factor ($0 \leq \alpha \leq 1$). A larger $\alpha$ would give more weight to data buffer size whereas a smaller $\alpha$ would give more weight to bucket level.

The UE may arrange the multiple logical channels in an order based on their weighted sum metrics, with the first logical channel having the largest metric, the second logical channel having the next largest metric, and so on, and the last logical channel having the smallest metric. The weighted sum metric for a logical channel may be a positive value or a non-positive value. For positive metrics, logical channels with larger metrics are ordered before logical channels with smaller metrics. For non-positive metrics, logical channels with less negative metrics are ordered before logical channels with more negative metrics. For example, if two logical channels have metrics of −50 and −80, then the logical channel with a metric of −50 is ordered before the logical channel with a metric of −80. The UE may order the multiple logical channels at the start of each scheduling interval, since the data buffer sizes and/or the bucket levels may change from one scheduling interval to the next.

For the current scheduling interval, the UE may select one logical channel at a time for scheduling based on the arranged order. In particular, the UE may select the first logical channel with the largest metric for scheduling, then the second logical channel with the next largest metric, and so on, and then the last logical channel with the smallest metric. The UE may schedule each selected logical channel for data transmission in various manners, as described below.

In a seventh design of channel selection, multiple logical channels with the same bucket level polarity and the same priority may be selected based on their normalized data buffer sizes and normalized bucket levels. The UE may compute a normalized weighted sum metric for each logical channel based on the normalized data buffer size and the normalized bucket level for the logical channel, as follows:

$$NMj = \frac{\alpha * Lj + (1 - \alpha) * Bj}{PBRj}, \text{ or} \qquad \text{Eq (7)}$$

$$NMj = \frac{\alpha * Lj + (1 - \alpha) * Bj}{BSj}, \qquad \text{Eq (8)}$$

where NMj is the normalized weighted sum metric for logical channel j, and α is a weighting factor (0≦α≦1). The normalization may ensure fairness.

The UE may arrange the multiple logical channels in an order based on their normalized weighted sum metrics, with the first logical channel having the largest normalized metric, the second logical channel having the next largest normalized metric, and so on, and the last logical channel having the smallest normalized metric. The normalized weighted sum metric for a logical channel may be a positive value or a non-positive value. For positive normalized metrics, logical channels with larger normalized metrics are ordered before logical channels with smaller normalized metrics. For non-positive normalized metrics, logical channels with less negative normalized metrics are ordered before logical channels with more negative normalized metrics. For example, if two logical channels have normalized metrics of −0.1 and −0.2, then the logical channel with a normalized metric of −0.1 is ordered before the logical channel with a normalized metric of −0.2. The UE may order the multiple logical channels at the start of each scheduling interval, since the data buffer sizes and/or the bucket levels may change from one scheduling interval to the next.

For the current scheduling interval, the UE may select one logical channel at a time for scheduling based on the arranged order. In particular, the UE may select the first logical channel with the largest normalized metric for scheduling, then the second logical channel with the next largest normalized metric, and so on, and then the last logical channel with the smallest normalized metric. The UE may schedule each selected logical channel for data transmission in various manners, as described below.

In the first through seventh designs of channel selection described above, the UE may select one logical channel at a time for scheduling and may schedule each selected logical channel. The UE may also select logical channels for scheduling in other manners, e.g., based on other criteria. In any case, the UE may schedule each selected logical channel for data transmission in various manners.

In a first design of channel scheduling, the UE may allocate resources to a selected logical channel such that all data in the data buffer for the logical channel can be sent. If there is insufficient resources to schedule a particular logical channel x for full data transmission in the current scheduling interval, then the UE may perform one of the following:

Not schedule logical channel x in the current scheduling interval, and select logical channel x for scheduling in the next scheduling interval, Schedule logical channel x for partial data transmission in the current scheduling interval based on the available resources, treat logical channel x as not being scheduled in the current scheduling interval, and select logical channel x again for scheduling in the next scheduling interval, Schedule logical channel x for partial data transmission in the current scheduling interval based on the available resources, and treat logical channel x as being scheduled in the current scheduling interval.

In a second design of channel scheduling, the UE may allocate resources to a selected logical channel such that a particular amount of data can be sent on the logical channel. This particular amount may be a predetermined number of bytes, or a predetermined fraction of the data buffer size, or a predetermined fraction of the bucket size, etc.

In general, the UE may allocate resources to a selected logical channel such that all or a fraction of the data in the data buffer for the logical channel can be sent. The UE may schedule all selected logical channels in the same manner (e.g., allocate sufficient resources to transmit all data for each selected logical channel). Alternatively, the UE may schedule some selected logical channels in one way (e.g., allocate sufficient resources to transmit all data) and may schedule other selected logical channels in another way (e.g., allocate resources to transmit a fraction of the data for each selected logical channel).

In another design of scheduling multiple logical channels with the same bucket level polarity and the same priority, the UE may select a set of (e.g., all) logical channels for scheduling and may allocate a fraction of the available resources to each logical channel. The UE may determine a fractional allocation for each logical channel based on one or more criteria such as data buffer size, bucket level, prioritized bit rate, bucket size, etc. For example, the UE may determine the fractional allocation for each logical channel based on one of the following:

$$Fj = \frac{Lj}{\sum_i Li}, \text{ or} \qquad \text{Eq (9)}$$

$$F_j = \frac{B_j + u}{\sum_i (B_i + u)}, \text{ or} \qquad \text{Eq (10)}$$

$$F_j = \frac{NL_j}{\sum_i NL_i}, \text{ or} \qquad \text{Eq (11)}$$

$$F_j = \frac{(NB_j + v)}{\sum_i (NB_i + v)}, \text{ or} \qquad \text{Eq (12)}$$

$$F_j = \frac{(M_j + w)}{\sum_i (M_i + w)}, \text{ or} \qquad \text{Eq (13)}$$

$$F_j = \frac{(NM_j + z)}{\sum_i (NM_i + z)}, \qquad \text{Eq (14)}$$

where Fj is a fractional allocation of resources for logical channel j, and u, v, w and z are offset variables used to provide positive fractions for negative values.

The fractional allocation for each logical channel may be determined based on the data buffer size as shown in equation (9), or the bucket level as shown in equation (10), or the normalized data buffer size as shown in equation (11), or the normalized bucket level as shown in equation (12), or a weighted sum metric as shown in equation (13), or a normalized weighted sum metric as shown in equation (14), or some other criterion. As noted above, Bj, NBj, Mj and NMj may each have a positive value or a non-positive value. For positive values, the fractional allocation for each logical channel may be computed as shown in any one of equations (9) through (14). For non-positive values, the fractional allocation for each logical channel may be computed to provide a higher fractional allocation to a less negative value and a smaller fractional allocation to a larger negative value. Offset variables u, v, w and z in equations (10), (12), (13) and (14), respectively, may be used to provide positive fractional allocations for negative values. In particular, each offset variable may be set to allow the most negative values in a summation to be positive. If all values in the summation are non-negative, then the offset variable may be set to zero.

The UE may allocate resources to each logical channel based on its fractional allocation, as follows:

$$R_j = F_j * R_{avail}, \qquad \text{Eq (15)}$$

where Rj is the resources allocated to logical channel j, and Ravail is the available resources at the UE.

The scheduling techniques described herein may provide various advantages. The techniques may improve performance of all logical channels by considering the characteristics of the logical channels in scheduling. The techniques may also provide certain bandwidth to each logical channel and avoid a scenario in which one logical channel with a large amount of data in a data buffer dominates transmission.

Figure 6:
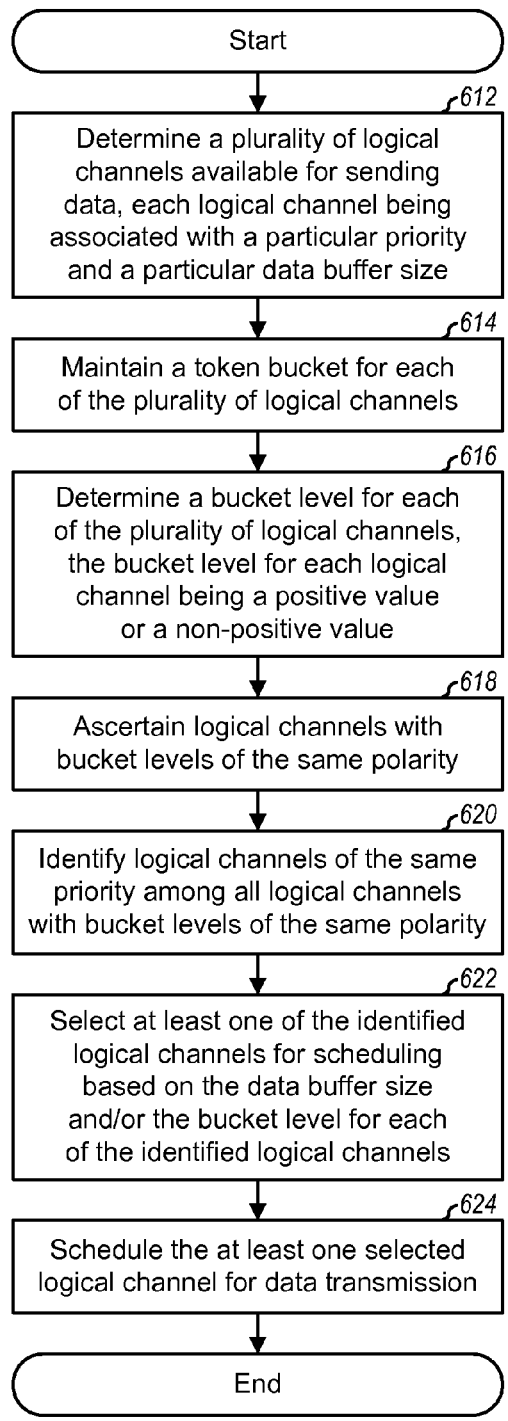
FIG. 6 shows a process for scheduling logical channels for data transmission.

FIG. 6 shows a design of a process 600 for scheduling logical channels for data transmission. Process 600 may be performed by a UE for data transmission on the uplink (as described below) or by a base station or some other network entity for data transmission on the downlink (not described below).

The UE may determine a plurality of logical channels available for sending data (block 612). Each logical channel may be associated with (i) a particular priority that may be set to one of a plurality of possible priority levels and (ii) a particular data buffer size indicative of the amount of data to send on the logical channel. Each logical channel may also be associated with a particular prioritized bit rate indicative of an average data rate for the logical channel. The priority and the prioritized bit rate for each logical channel may be configured by upper layers (e.g., RRC) and conveyed to the UE via upper layer signaling.

The UE may maintain a token bucket for each of the plurality of logical channels (block 614). For example, the UE may update (e.g., increase) a bucket level for each logical channel in each time interval based on the prioritized bit rate for the logical channel. The UE may also update (e.g., decrease) the bucket level for each logical channel that is scheduled for data transmission. Each logical channel may be associated with a particular bucket size, which may be configured by upper layers and conveyed to the UE.

The UE may determine the bucket level for each of the plurality of logical channels, e.g., in each scheduling interval or when an uplink grant is received by the UE (block 616). The bucket level for each logical channel may be a positive value or a non-positive value and may be indicative of tokens available for use to send data on the logical channel. The UE may ascertain logical channels with bucket levels of the same polarity, e.g., either positive or non-positive (block 618). The UE may then identify logical channels of the same priority among all logical channels with bucket levels of the same polarity (block 620). The identified logical channels may have the same priority and the same bucket level polarity.

The UE may select at least one of the identified logical channels for scheduling based on the data buffer size and/or the bucket level for each of the identified logical channels (block 622). The UE may schedule the at least one selected logical channel for data transmission (block 624).

In one design of block 622, the UE may select one identified logical channel at a time for scheduling. The UE may determine a metric for each identified logical channel based on the data buffer size, or the bucket level, or both for the identified logical channel. The UE may sort the identified logical channels in an order based on the metric for each identified logical channel, from largest/best metric to smallest/worst metric. The UE may then select one identified logical channel at a time for scheduling based on the order of the identified logical channels.

In one design, the metric for each identified logical channel may be equal to the data buffer size for the identified logical channel. The identified logical channels may be sorted in an order from largest data buffer size to smallest data buffer size. In another design, the metric for each identified logical channel may be equal to the bucket level for the identified logical channel. The identified logical channels may be sorted in an order from highest bucket level to lowest bucket level. In yet another design, the metric for each identified logical channel is equal to a weighted sum of the data buffer size and the bucket level for the identified logical channel, e.g., as shown in equation (6). The identified logical channels may be sorted in an order from largest weighted sum to smallest weighted sum.

In another design, the metric for each identified logical channel may be determined based further on a normalization factor for the identified logical channel. The normalization factor for each identified logical channel may be determined based on the prioritized bit rate, the bucket size, and/or some other parameter for the identified logical channel.

In one design, the metric for each identified logical channel may be equal to a normalized data buffer size determined based on the data buffer size and the normalization factor for the identified logical channel, e.g., as shown in equation (2) or (3). The identified logical channels may be sorted in an order from largest normalized data buffer size to smallest normalized data buffer size. In another design, the metric for each identified logical channel may be equal to a normalized bucket level determined based on the bucket level and the normalization factor for the identified logical channel, e.g., as shown in equation (4) or (5). The identified logical channels may be sorted in an order from highest normalized bucket level to lowest normalized bucket level. In yet another design, the metric for each identified logical channel may be equal to a normalized weighted sum of the data buffer size and the bucket level for the identified logical channel. The normalized weighted sum may be determined based on the data buffer size, the bucket level, and the normalization factor for the identified logical channel, e.g., as shown in equation (7) or (8). The identified logical channels may be sorted in an order from largest normalized weighted sum to smallest normalized weighted sum.

In one design of block 624, each selected logical channel may be scheduled for transmission of all data in a data buffer for the selected logical channel, if sufficient resources are available. In another design, each selected logical channel may be scheduled for transmission of a predetermined amount of data, or a predetermined fraction of data in the data buffer for the selected logical channel, or a predetermined fraction of the bucket size, or some other amount of data for the selected logical channel.

In another design of blocks 622 and 624, the UE may select multiple (e.g., all) identified logical channels for scheduling at the same time. The UE may determine a fractional allocation for each identified logical channel based on the data buffer size and/or the bucket level for the identified logical channel, e.g., as shown in equation (9), (10), or (13). The UE may determine the fractional allocation for each identified logical channel based further on a normalization factor for the identified logical channel. For example, the UE may determine the normalized data buffer size, or the normalized bucket level, or the normalized weighted sum metric for each identified logical channel based on the normalization factor for the identified logical channel. The UE may then determine the fractional allocation for each identified logical channel based on the normalized data buffer size, or the normalized bucket level, or the normalized metric for the identified logical channel, e.g., as shown in equation (11), (12) or (14). The UE may determine the fractional allocation for each identified logical channel based further on an overall normalization factor for all identified logical channels. The overall normalization factor may correspond to the denominator in equations (9) through (14). The UE may then allocate the available resources to each identified logical channel based on the fractional allocation determined for the identified logical channel, e.g., as shown in equation (15).

The bucket levels for the identified logical channels may be non-positive values. In this case, smaller negative values may be considered as being larger/higher whereas larger negative values may be considered as being smaller/lower for sorting the identified logical channels and for allocating resources to the identified logical channels, as described above.

In yet another design, the UE may select one identified logical channel at a time for scheduling based on round robin in block 622. The UE may sort the identified logical channels in a pseudo-random manner or based on one or more criteria. The one or more criteria may include the data buffer size and/or the bucket level for each identified logical channel.

Figure 7:
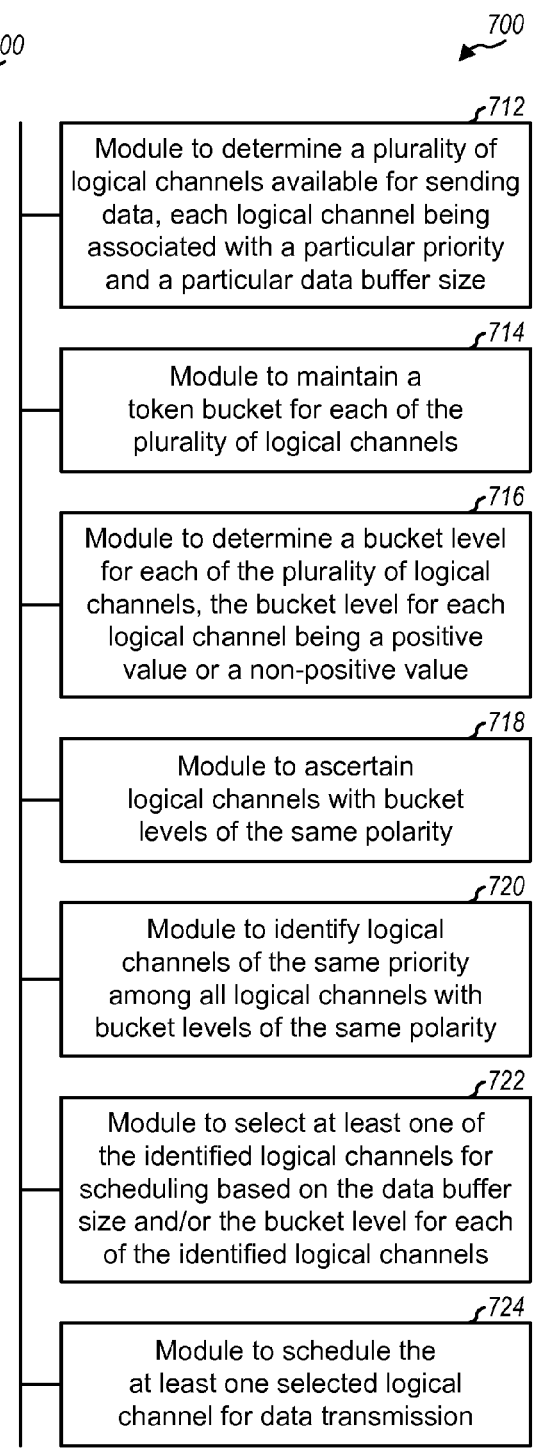
FIG. 7 shows an apparatus for scheduling logical channels for data transmission.

FIG. 7 shows a design of an apparatus 700 for scheduling logical channels for data transmission. Apparatus 700 includes a module 712 to determine a plurality of logical channels available for sending data, with each logical channel being associated with a particular priority and a particular data buffer size indicative of the amount of data to send on the logical channel, a module 714 to maintain a token bucket for each of the plurality of logical channels, a module 716 to determine a bucket level for each of the plurality of logical channels, with the bucket level for each logical channel being a positive value or a non-positive value and indicative of tokens available for use to send data on the logical channel, a module 718 to ascertain logical channels with bucket levels of the same polarity, a module 720 to identify logical channels of the same priority among all logical channels with bucket levels of the same polarity, a module 722 to select at least one of the identified logical channels for scheduling based on the data buffer size and/or the bucket level for each of the identified logical channels, and a module 724 to schedule the at least one selected logical channel for data transmission.

The modules in FIG. 7 may comprise processors, electronic devices, hardware devices, electronic components, logical circuits, memories, software codes, firmware codes, etc., or any combination thereof.

Figure 8:
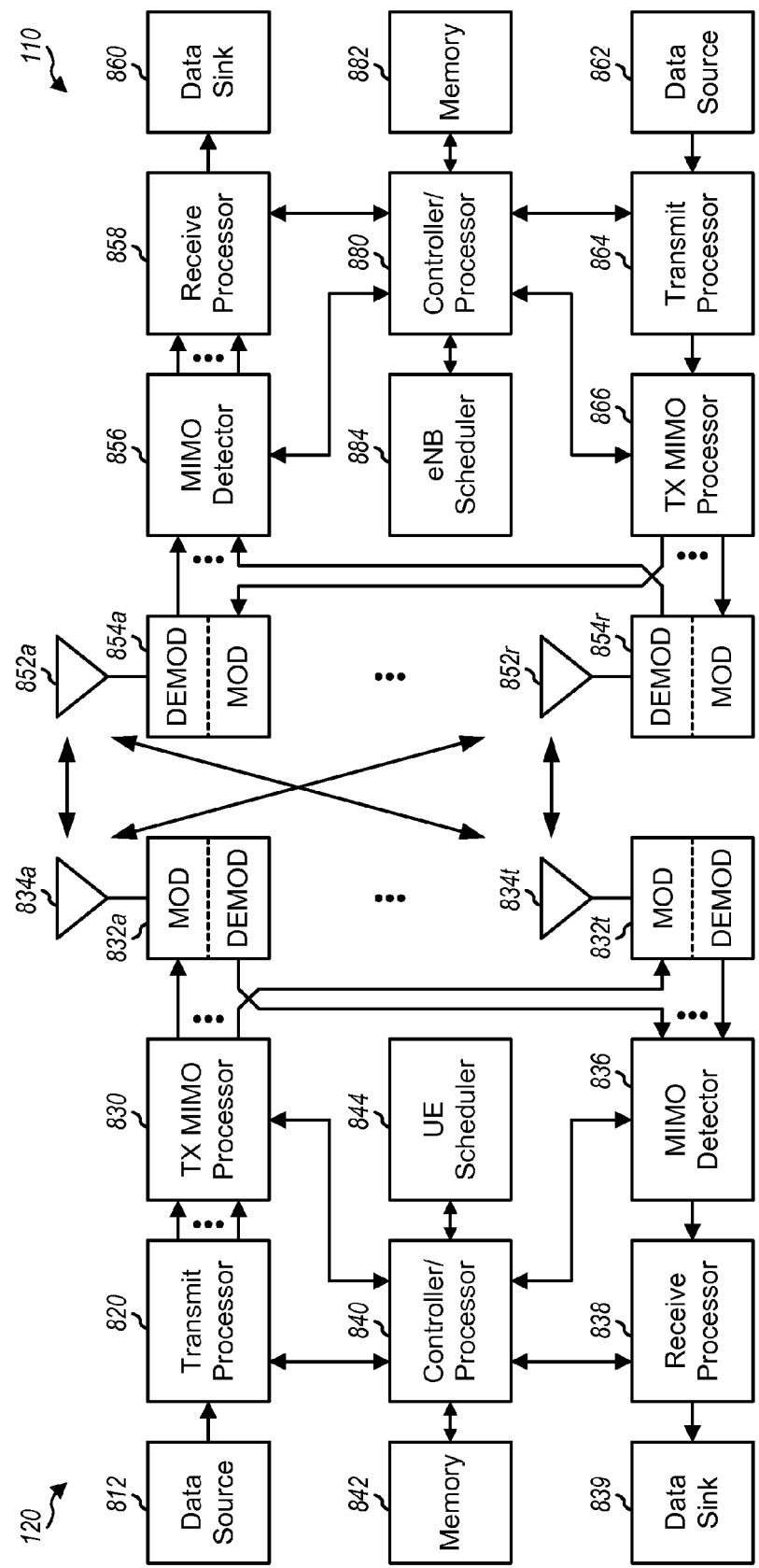
FIG. 8 shows a block diagram of a base station and a UE.

FIG. 8 shows a block diagram of a design of an eNB/base station 110 and a UE 120, which may be one of the eNBs and one of the UEs in FIG. 1. UE 120 may be equipped with T antennas 834a through 834t, and eNB 110 may be equipped with R antennas 852a through 852r, where in general T≧1 and R≧1.

At UE 120, a transmit processor 820 may receive traffic data for one or more scheduled logical channels from a data source 812 and control data/information from data source 812 and/or a controller/processor 840. Data source 812 may implement data buffers for all logical channels configured at UE 120 and may provide traffic data for each scheduled logical channel. Transmit processor 820 may process (e.g., encode, interleave, and symbol map) the traffic data and control data and may provide data symbols and control symbols, respectively. Transmit processor 820 may also generate reference symbols for one or more reference signals. A transmit (TX) multiple-input multiple-output (MIMO) processor 830 may perform spatial processing (e.g., precoding) on the data symbols, the control symbols, and/or the reference symbols, if applicable, and may provide T output symbol streams to T modulators (MODs) 832a through 832t. Each modulator 832 may process a respective output symbol stream (e.g., for SC-FDMA, OFDM, etc.) to obtain an output sample stream. Each modulator 832 may further process (e.g., convert to analog, amplify, filter, and upconvert) the output sample stream to obtain an uplink signal. T uplink signals from modulators 832a through 832t may be transmitted via T antennas 834a through 834t, respectively.

At eNB 110, antennas 852a through 852r may receive the uplink signals from UE 120 and provide received signals to demodulators (DEMODs) 854a through 854r, respectively. Each demodulator 854 may condition (e.g., filter, amplify, downconvert, and digitize) a respective received signal to obtain received samples. Each demodulator 854 may further process the received samples to obtain received symbols. A MIMO detector 856 may obtain received symbols from all R demodulators 854a through 854r and may perform MIMO detection on the received symbols to obtain detected symbols. A receive processor 858 may process (e.g., symbol demap, deinterleave, and decode) the detected symbols, provide decoded traffic data to a data sink 860, and provide decoded control data to a controller/processor 880.

On the downlink, at eNB 110, traffic data from a data source 862 and control data (e.g., uplink grants, upper layer signaling, etc.) from data source 862 and/or controller/processor 880 may be processed by a transmit processor 864, precoded by a TX MIMO processor 866 if applicable, conditioned by modulators 854a through 854r, and transmitted to UE 120. At UE 120, the downlink signals from eNB 110 may be received by antennas 834, conditioned by demodulators 832, processed by a MIMO detector 836, and further processed by a receive processor 838 to obtain the traffic data and control data sent to UE 120. Processor 838 may provide the decoded traffic data to a data sink 839 and the decoded control data to controller/processor 840.

Controllers/processors 840 and 880 may direct the operation at UE 120 and eNB 110, respectively. Memories 842 and 882 may store data and program codes for UE 120 and eNB 110, respectively. A UE scheduler 844 may schedule logical channels at UE 120 for data transmission on the uplink and may allocate resources to the scheduled logical channels. An eNB scheduler 884 may schedule UEs for downlink and/or uplink transmission and may assign resources to the scheduled UEs. Processor 840, scheduler 844, and/or other processors and modules at UE 120 may perform or direct process 400 in FIG. 4, process 500 in FIG. 5, process 600 in FIG. 6, and/or other processes for the techniques described herein for data transmission on the uplink. Processor 880, scheduler 884, and/or other processors and modules at eNB 110 may perform or direct process 400 in FIG. 4, process 500 in FIG. 5, process 600 in FIG. 6, and/or other processes for the techniques described herein data transmission on the downlink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a plurality of logical channels available for sending data, each logical channel being associated with a particular priority and a particular data buffer size indicative of amount of data to send on the logical channel;
   maintaining a token bucket for each of the plurality of logical channels;
   determining a bucket level for each of the plurality of logical channels, the bucket level for each logical channel being a positive value indicative of tokens available for use to send data on the logical channel, or zero, or a negative value indicative of data having been sent on the logical channel when there are no tokens in the token bucket for the logical channel;

ascertaining logical channels with bucket levels of same polarity among the plurality of logical channels;

identifying logical channels of same priority among all logical channels with bucket levels of the same polarity, the identified logical channels having the same priority and the same bucket level polarity; and selecting at least one of the identified logical channels for scheduling based on the data buffer size, or the bucket level, or both for each of the identified logical channels.

2. A method for wireless communication, comprising:

determining a plurality of logical channels available for sending data, each logical channel being associated with a particular priority and a particular data buffer size indicative of amount of data to send on the logical channel;

maintaining a token bucket for each of the plurality of logical channels;

determining a bucket level for each of the plurality of logical channels, the bucket level for each logical channel being a positive value or a non-positive value and indicative of tokens available for use to send data on the logical channel;

ascertaining logical channels with bucket levels of same polarity;

identifying logical channels of same priority among all logical channels with bucket levels of the same polarity, the identified logical channels having the same priority and the same bucket level polarity; and selecting at least one of the identified logical channels for scheduling based on the data buffer size, or the bucket level, or both for each of the identified logical channels, wherein the selecting at least one of the identified logical channels for scheduling comprises determining a metric for each identified logical channel based on the data buffer size, or the bucket level, or both for the identified logical channel, sorting the identified logical channels in an order based on the metric for each identified logical channel, and selecting one identified logical channel at a time for scheduling based on the order of the identified logical channels.

3. The method of claim 2, wherein the metric for each identified logical channel is equal to the data buffer size for the identified logical channel, and wherein the identified logical channels are sorted in an order from largest data buffer size to smallest data buffer size.

4. The method of claim 2, wherein the metric for each identified logical channel is equal to a normalized data buffer size determined based on the data buffer size and a normalization factor for the identified logical channel, and wherein the identified logical channels are sorted in an order from largest normalized data buffer size to smallest normalized data buffer size.

5. The method of claim 2, wherein the metric for each identified logical channel is equal to the bucket level for the identified logical channel, and wherein the identified logical channels are sorted in an order from highest bucket level to lowest bucket level.

6. The method of claim 2, wherein the metric for each identified logical channel is equal to a normalized bucket level determined based on the bucket level and a normalization factor for the identified logical channel, and wherein the identified logical channels are sorted in an order from highest normalized bucket level to lowest normalized bucket level.

7. The method of claim 2, wherein the metric for each identified logical channel is equal to a weighted sum of the data buffer size and the bucket level for the identified logical channel, and wherein the identified logical channels are sorted in an order from largest weighted sum to smallest weighted sum.

8. The method of claim 2, wherein the metric for each identified logical channel is equal to a normalized weighted sum of the data buffer size and the bucket level for the identified logical channel, the normalized weighted sum being determined based on the data buffer size, the bucket level, and a normalization factor for the identified logical channel, and wherein the identified logical channels are sorted in an order from largest normalized weighted sum to smallest normalized weighted sum.

9. The method of claim 2, wherein the metric for each identified logical channel is determined based further on a normalization factor for the identified logical channel.

10. The method of claim 9, wherein each of the plurality of logical channels is further associated with a particular prioritized bit rate indicative of an average data rate for the logical channel, and wherein the normalization factor for each identified logical channel is determined based on the prioritized bit rate for the identified logical channel.

11. The method of claim 9, wherein each of the plurality of logical channels is further associated with a particular bucket size of the token bucket for the logical channel, and wherein the normalization factor for each identified logical channel is determined based on the bucket size for the identified logical channel.

12. The method of claim 1, further comprising:
scheduling the at least one selected logical channel for data transmission.

13. The method of claim 12, wherein each selected logical channel is scheduled for transmission of all data in a data buffer for the selected logical channel, if sufficient resources are available.

14. The method of claim 12, wherein each selected logical channel is scheduled for transmission of a predetermined amount of data, or a predetermined fraction of data in a data buffer for the selected logical channel, or a predetermined fraction of a bucket size of the token bucket for the selected logical channel.

15. The method of claim 1, wherein the selecting at least one of the identified logical channels for scheduling comprises determining a fractional allocation for each identified logical channel based on the data buffer size, or the bucket level, or both for the identified logical channel, and allocating available resources to each identified logical channel based on the fractional allocation determined for the identified logical channel.

16. The method of claim 15, wherein the determining the fractional allocation for each identified logical channel comprises determining the fractional allocation for each identified logical channel based further on a normalization factor for the identified logical channel.

17. A method for wireless communication, comprising:

determining a plurality of logical channels available for sending data, each logical channel being associated with a particular priority;

maintaining a token bucket for each of the plurality of logical channels;

determining a bucket level for each of the plurality of logical channels, the bucket level for each logical channel being a positive value indicative of tokens available for use to send data on the logical channel, or zero, or a negative value indicative of data having been sent on the logical channel when there are no tokens in the token bucket for the logical channel;

ascertaining logical channels with bucket levels of same polarity among the plurality of logical channels;

identifying logical channels of same priority among all logical channels with bucket levels of the same polarity, the identified logical channels having the same priority and the same bucket level polarity; and selecting one identified logical channel at a time for scheduling based on round robin.

18. An apparatus for wireless communication, comprising:

means for determining a plurality of logical channels available for sending data, each logical channel being associated with a particular priority and a particular data buffer size indicative of amount of data to send on the logical channel;

means for maintaining a token bucket for each of the plurality of logical channels;

means for determining a bucket level for each of the plurality of logical channels, the bucket level for each logical channel being a positive value or a non-positive value and indicative of tokens available for use to send data on the logical channel, or zero, or a negative value indicative of data having been sent on the logical channel when there are no tokens in the token bucket for the logical channel;

means for ascertaining logical channels with bucket levels of same polarity among the plurality of logical channels;

means for identifying logical channels of same priority among all logical channels with bucket levels of the same polarity, the identified logical channels having the same priority and the same bucket level polarity; and means for selecting at least one of the identified logical channels for scheduling based on the data buffer size, or the bucket level, or both for each of the identified logical channels.

19. An apparatus for wireless communication, comprising:

means for determining a plurality of logical channels available for sending data, each logical channel being associated with a particular priority and a particular data buffer size indicative of amount of data to send on the logical channel;

means for maintaining a token bucket for each of the plurality of logical channels;

means for determining a bucket level for each of the plurality of logical channels, the bucket level for each logical channel being a positive value or a non-positive value and indicative of tokens available for use to send data on the logical channel;

means for ascertaining logical channels with bucket levels of same polarity;

means for identifying logical channels of same priority among all logical channels with bucket levels of the same polarity, the identified logical channels having the same priority and the same bucket level polarity; and means for selecting at least one of the identified logical channels for scheduling based on the data buffer size, or the bucket level, or both for each of the identified logical channels, wherein the means for selecting at least one of the identified logical channels for scheduling comprises means for determining a metric for each identified logical channel based on the data buffer size, or the bucket level, or both for the identified logical channel, means for sorting the identified logical channels in an order based on the metric for each identified logical channel, and means for selecting one identified logical channel at a time for scheduling based on the order of the identified logical channels.

20. The apparatus of claim 19, wherein the metric for each identified logical channel is equal to the data buffer size for the identified logical channel, and wherein the identified logical channels are sorted in an order from largest data buffer size to smallest data buffer size.

21. The apparatus of claim 19, wherein the metric for each identified logical channel is equal to a normalized data buffer size determined based on the data buffer size and a normalization factor for the identified logical channel, and wherein the identified logical channels are sorted in an order from largest normalized data buffer size to smallest normalized data buffer size.

22. The apparatus of claim 19, wherein the metric for each identified logical channel is equal to the bucket level for the identified logical channel, and wherein the identified logical channels are sorted in an order from highest bucket level to lowest bucket level.

23. The apparatus of claim 19, wherein the metric for each identified logical channel is equal to a normalized bucket level determined based on the bucket level and a normalization factor for the identified logical channel, and wherein the identified logical channels are sorted in an order from highest normalized bucket level to lowest normalized bucket level.

24. The apparatus of claim 19, wherein the metric for each identified logical channel is equal to a weighted sum of the data buffer size and the bucket level for the identified logical channel, and wherein the identified logical channels are sorted in an order from largest weighted sum to smallest weighted sum.

25. The apparatus of claim 19, wherein the metric for each identified logical channel is equal to a normalized weighted sum of the data buffer size and the bucket level for the identified logical channel, the normalized weighted sum being determined based on the data buffer size, the bucket level, and a normalization factor for the identified logical channel, and wherein the identified logical channels are sorted in an order from largest normalized weighted sum to smallest normalized weighted sum.

26. The apparatus of claim 18, wherein the means for selecting at least one of the identified logical channels for scheduling comprises means for determining a fractional allocation for each identified logical channel based on the data buffer size, or the bucket level, or both for the identified logical channel, and means for allocating available resources to each identified logical channel based on the fractional allocation determined for the identified logical channel.

27. An apparatus for wireless communication, comprising:

at least one processor configured to:

determine a plurality of logical channels available for sending data, each logical channel being associated with a particular priority and a particular data buffer size indicative of amount of data to send on the logical channel, maintain a token bucket for each of the plurality of logical channels, determine a bucket level for each of the plurality of logical channels, the bucket level for each logical channel being a positive value indicative of tokens available for use to send data on the logical channel, or zero, or a negative value indicative of data having been sent on the logical channel when there are no tokens in the token bucket for the logical channel, ascertain logical channels with bucket levels of same polarity among the plurality of logical channels, identify logical channels of same priority among all logical channels with bucket levels of the same polarity, the identified logical channels having the same priority and the same bucket level polarity, and select at least one of the identified logical channels for scheduling based on the data buffer size, or the bucket level, or both for each of the identified logical channels.

28. An apparatus for wireless communication, comprising:
at least one processor configured to:
   determine a plurality of logical channels available for sending data, each logical channel being associated with a particular priority and a particular data buffer size indicative of amount of data to send on the logical channel,
   maintain a token bucket for each of the plurality of logical channels,
   determine a bucket level for each of the plurality of logical channels, the bucket level for each logical channel being a positive value or a non-positive value and indicative of tokens available for use to send data on the logical channel,
   ascertain logical channels with bucket levels of same polarity,
   identify logical channels of same priority among all logical channels with bucket levels of the same polarity, the identified logical channels having the same priority and the same bucket level polarity,
   select at least one of the identified logical channels for scheduling based on the data buffer size, or the bucket level, or both for each of the identified logical channels,
   determine a metric for each identified logical channel based on the data buffer size, or the bucket level, or both for the identified logical channel,
   sort the identified logical channels in an order based on the metric for each identified logical channel, and
   select one identified logical channel at a time for scheduling based on the order of the identified logical channels.

29. The apparatus of claim 28, wherein the metric for each identified logical channel is equal to the data buffer size for the identified logical channel, and wherein the identified logical channels are sorted in an order from largest data buffer size to smallest data buffer size.

30. The apparatus of claim 28, wherein the metric for each identified logical channel is equal to a normalized data buffer size determined based on the data buffer size and a normalization factor for the identified logical channel, and wherein the identified logical channels are sorted in an order from largest normalized data buffer size to smallest normalized data buffer size.

31. The apparatus of claim 28, wherein the metric for each identified logical channel is equal to the bucket level for the identified logical channel, and wherein the identified logical channels are sorted in an order from highest bucket level to lowest bucket level.

32. The apparatus of claim 28, wherein the metric for each identified logical channel is equal to a normalized bucket level determined based on the bucket level and a normalization factor for the identified logical channel, and wherein the identified logical channels are sorted in an order from highest normalized bucket level to lowest normalized bucket level.

33. The apparatus of claim 28, wherein the metric for each identified logical channel is equal to a weighted sum of the data buffer size and the bucket level for the identified logical channel, and wherein the identified logical channels are sorted in an order from largest weighted sum to smallest weighted sum.

34. The apparatus of claim 28, wherein the metric for each identified logical channel is equal to a normalized weighted sum of the data buffer size and the bucket level for the identified logical channel, the normalized weighted sum being determined based on the data buffer size, the bucket level, and a normalization factor for the identified logical channel, and wherein the identified logical channels are sorted in an order from largest normalized weighted sum to smallest normalized weighted sum.

35. The apparatus of claim 27, wherein the at least one processor is configured to determine a fractional allocation for each identified logical channel based on the data buffer size, or the bucket level, or both for the identified logical channel, and to allocate available resources to each identified logical channel based on the fractional allocation determined for the identified logical channel.

36. A computer program product, comprising:
a non-transitory computer-readable medium comprising:
   code for causing at least one computer to determine a plurality of logical channels available for sending data, each logical channel being associated with a particular priority and a particular data buffer size indicative of amount of data to send on the logical channel,
   code for causing the at least one computer to maintain a token bucket for each of the plurality of logical channels,
   code for causing the at least one computer to determine a bucket level for each of the plurality of logical channels, the bucket level for each logical channel being a positive value indicative of tokens available for use to send data on the logical channel, or zero, or a negative value indicative of data having been sent on the logical channel when there are no tokens in the token bucket for the logical channel,
   code for causing the at least one computer to ascertain logical channels with bucket levels of same polarity among the plurality of logical channels,
   code for causing the at least one computer to identify logical channels of same priority among all logical channels with bucket levels of the same polarity, the identified logical channels having the same priority and the same bucket level polarity, and
   code for causing the at least one computer to select at least one of the identified logical channels for scheduling based on the data buffer size, or the bucket level, or both for each of the identified logical channels.

* * * * *